(12) United States Patent
Eberlein (10) Patent No.: US 9,032,406 B2
(45) Date of Patent: May 12, 2015

(54) COOPERATIVE BATCH SCHEDULING IN MULTITENANCY SYSTEM BASED ON ESTIMATED EXECUTION TIME AND GENERATING A LOAD DISTRIBUTION CHART

(75) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 534 days.

(21) Appl. No.: 12/828,308

(22) Filed: Jul. 1, 2010

(65) Prior Publication Data

US 2012/0005597 A1 Jan. 5, 2012

(51) Int. Cl.
*G06F 3/00* (2006.01)
*G06F 9/46* (2006.01)
*G06F 11/32* (2006.01)
*G06F 9/48* (2006.01)
*G06F 11/34* (2006.01)
*G06F 3/12* (2006.01)

(52) U.S. Cl.
CPC ............ *G06F 11/323* (2013.01); *G06F 9/4881* (2013.01); *G06F 3/126* (2013.01); *G06F 11/3419* (2013.01); *G06F 11/3433* (2013.01)

(58) Field of Classification Search
CPC ......... G06F 3/00; G06F 3/126; G06F 3/1262; G06F 9/46; G06F 9/466; G06F 9/4843; G06F 9/5038; G06F 9/4881; G06F 9/505; G06F 9/5066; G06F 9/5055; G06F 11/323; G06F 11/3419; G06F 11/3433

USPC .......................... 718/101, 102, 105; 715/751
See application file for complete search history.

(56) References Cited

U.S. PATENT DOCUMENTS

| | | | |
|---|---|---|---|
| 6,665,716 B1* | 12/2003 | Hirata et al. .................. | 709/224 |
| 7,263,695 B1* | 8/2007 | Muzaffar et al. ............. | 717/162 |
| 7,793,292 B2* | 9/2010 | Worek et al. .................. | 718/101 |
| 2007/0067201 A1* | 3/2007 | Malewicz .......................... | 705/9 |
| 2008/0320477 A1* | 12/2008 | Meeks .......................... | 718/102 |
| 2009/0217273 A1* | 8/2009 | Mutlu et al. .................. | 718/101 |
| 2010/0115520 A1* | 5/2010 | Kohno et al. ................. | 718/101 |
| 2010/0250174 A1* | 9/2010 | Tokunaga et al. .............. | 702/83 |
| 2010/0262948 A1* | 10/2010 | Melski et al. ................. | 717/101 |
| 2011/0161959 A1* | 6/2011 | Sharon et al. ................. | 718/101 |

\* cited by examiner

*Primary Examiner* — Meng An
*Assistant Examiner* — Abu Ghaffari (57) ABSTRACT

Systems and methods for cooperative batch scheduling in multitenancy computing systems are described. A number of batch requests are received in the computing system, where each batch request includes a job reference, and a start time when the execution of the referenced job to be launched. Duration of execution is estimated for each job referenced by the requests. The estimation is based on predefined criteria that include a product of median execution times for at least one recurring operation. An anonymous load chart is created based on the start times and the estimated duration of execution of each job referenced by the plurality of batch requests. The anonymous load chart may take into account the available capacity of the computing system. The anonymous load chart is exposed to a number of isolated users of the computing system for cooperative batch scheduling.

15 Claims, 6 Drawing Sheets

COOPERATIVE BATCH SCHEDULING IN MULTITENANCY SYSTEM BASED ON ESTIMATED EXECUTION TIME AND GENERATING A LOAD DISTRIBUTION CHART

TECHNICAL FIELD

The field relates generally to data processing and digital processing systems. More specifically, the field is related to cooperative batch scheduling within a shared computer systems environment.

BACKGROUND

The shift from on-premise software towards offering and using software as a service (SaaS) is one of the trends in the current development of the information technology (IT) industry. According to this model, instead of licensing software products that are installed on customer's servers, the customers pay for using software services provided over public or private computer networks. This approach has many advantages, for example, the customers avoid the costs associated with hosting the necessary software applications. The software vendors are also interested in selling software services to ensure regular income without giving up any of the ownership rights of their software. Therefore, in recent years there has been a proliferation of software of all kinds, and even hardware services provided over a network, mainly over the internet.

There are different approaches and solutions for providing software and hardware services over the internet. Typically, the customers do not own the hardware infrastructure and the software applications running on it, and the vendors employ utility computing models similar to the traditional utility services (e.g., electricity, water, etc.). Other vendors bill on a subscription basis. In either case, the customers pay for a service with particular characteristics and quality of service level. For example, when a customer buys a storage space, part of the agreement may be the size and a minimum response time to read and write requests. Similarly, the software services provided by the vendors over networks must comply with a required level of availability. To guarantee the necessary quality of service even at peak moments, the vendors have to ensure sufficient computer power in terms of hardware and software resources per customer.

There is a mutual interest between the vendors and the customers for high rates of the shared resources utilization to minimize idle computing power. The more efficient the usage of the available hardware and software resources, the lower is the pricing of the services provided. As a result, multitenancy architectures are adopted where a single computer system with a single instance of software runs to serve multiple, different customer organizations, e.g., tenants. This way, it is not necessary to setup a separate computer system with a separate instance of the software for each customer. The customers that share the same software and hardware resources are anonymous to each other and have to be completely isolated from one another. The complete isolation between customers is one of the most stringent requirements for providing software or hardware services over the internet. Because of the isolation, a customer is able to manage the consumption of shared resources only according to its needs, without an overview of the demand generated by other customers for the same resources. Hence, the vendors still need to store excessive computing power to handle peak resource consumptions.

SUMMARY

Various embodiments of systems and methods for cooperative batch scheduling in multitenancy computing systems are described herein. A number of batch job requests are received in a computing system, where each batch job request includes batch job identification (ID), e.g., a batch job reference, and a start time when the execution of the referenced batch job is to be launched. In one aspect, duration of execution is estimated for each batch job referenced by the requests. The estimation is based on predefined criteria that includes a product of median execution times for at least one recurring operation and the number of operations to be executed. In another aspect, an anonymous load chart is created based on the start times and the estimated duration of the execution of each batch job referenced by the plurality of batch job requests. The anonymous load chart may take into account the available capacity of the computing system. The anonymous load chart is exposed to a number of isolated users of the computing system for further re-scheduling of the requested batch jobs, or for scheduling of new batch jobs, according with the load distribution for a certain period.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for cooperative batch scheduling in multitenancy systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

According to one embodiment, the term "multitenancy" refers to a computer system architecture where a single instance of software runs on one or more servers to provide services to several isolated customers. The isolated consumers may access the computer system via a private or a public network, e.g., via the internet. The title of this document and the description of the embodiments below refer to multitenancy systems. However, similar techniques and principles may be embodied within other computing environments not compliant with the definition of multitenancy, where shared resources are accessed by a number of users.

Figure 1:
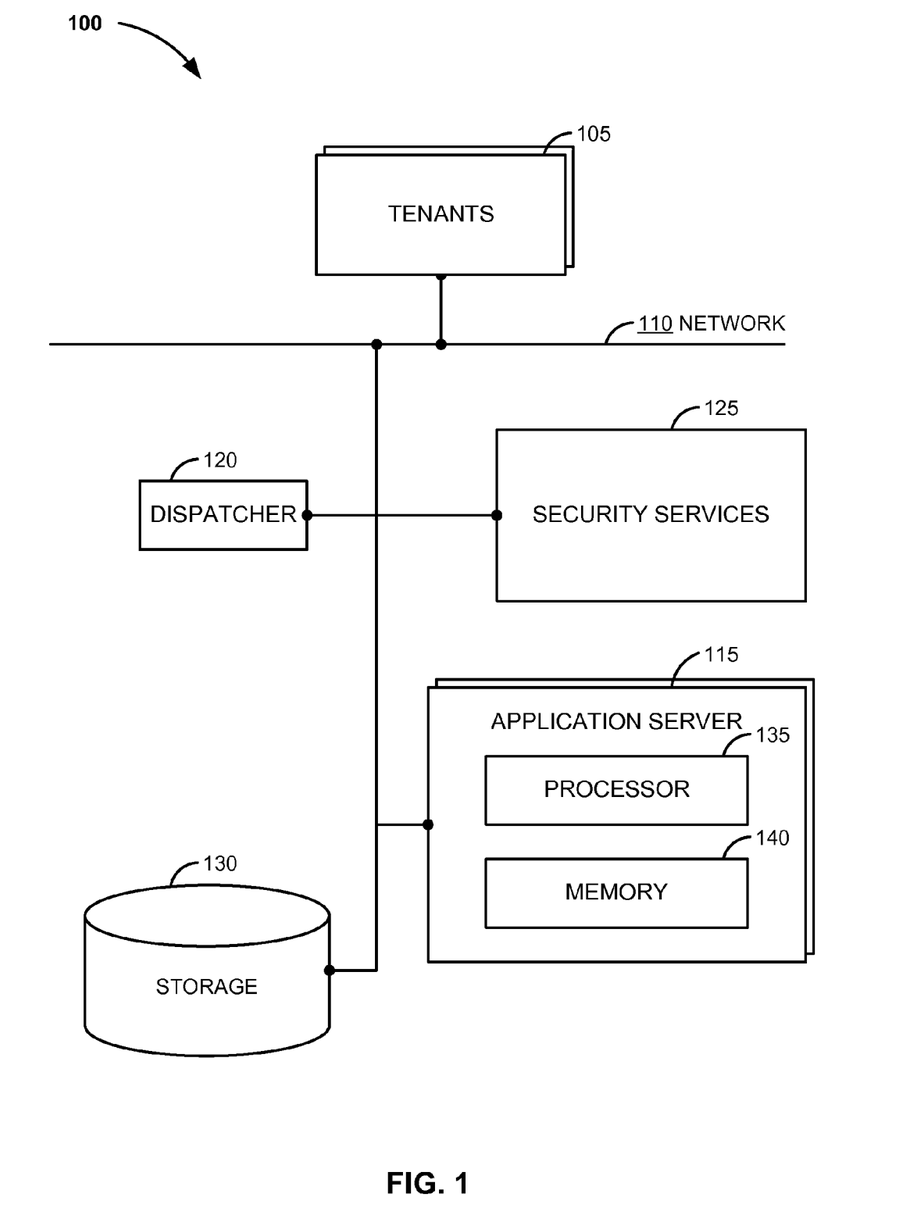
FIG. 1 is a block diagram illustrating multitenancy computer architecture, according to one embodiment of the invention.

FIG. 1 is an illustrative computing environment 100 where multiple tenants 105 access services over network 110 that are provided by one or more application servers 115. Typically, computer resources and application code provided by application servers 115 are shared between tenants 105. A same instance of application code may be stored in memory 140 and executed by processor 135 of each of the application servers 115. In one embodiment, several application servers 115 with identical or similar configuration may run in parallel to form a cluster. Thus, the multitenancy system can easily scale according to the required productivity depending on the number of tenants 105. Dispatcher 120 may distribute the services requests coming from the tenants 105 between the different application servers 115 according to their current load.

Each of the tenants 105 operates with its own set of data, logically isolated from data that belongs to the other tenants 105. Security services 125 control the access to the shared resources provided through the application servers 115. Security services 125 prevent any of tenants 105 from accidentally or maliciously viewing or changing data belonging to another tenant.

The data pertinent to tenants 105 may be kept in storage 130 together with various system and application data, e.g., source code, deployment information, system logs, etc. Depending on the implementation and the configuration of the multitenancy computing environment 100, a separate database may be created for each of the tenants 105 in storage 130. Alternatively, the multiple tenants 105 are hosted in the same database, where each of the tenants 105 may operate with its own set of tables grouped in a corresponding database schema. The data for all tenants 105 may also be stored in the same tables of a same database schema.

The multitenancy computer environment 100 must guarantee that tenants 105 are isolated from each other. Respectively, none of the tenants 105 can access data pertinent to another tenant. None of the tenants 105 should even be aware that other tenants share the same resources. Despite all the positive aspects of multitenancy, when the resources in multitenancy computer environment 100 are depleted, e.g., when the system is overloaded, tenants 105 may suffer bad performance. Moreover, the tenants 105 are not always aware of how to manage the scarce resources more efficiently, e.g., collaboratively. Therefore, to avoid low performance due to overload during peak resource consumption, multitenancy computing environment 100 provides a mechanism for collaborative job scheduling between the tenants 105. The provided mechanism does not compromise the isolation and anonymity between the tenants 105.

Today's computer applications have to be a lot more interactive than traditional transaction processing monitors. Users expect sub-second response times for almost all requests they submit, no matter how complex a request is or how many concurrent users per tenants load the system. Moreover, the modern computer applications still have to support long running batch jobs, or simple batches, for tasks that cannot be done within seconds or even minutes. While there is typically some flexibility in scheduling the start of execution of these batch jobs, they need to be scheduled carefully not to slow down the interactive processing that is going on in parallel. Therefore, the collaborative scheduling of batch jobs may significantly improve the overall system performance, and reduce the risks for the availability of the provided services.

Figure 2:
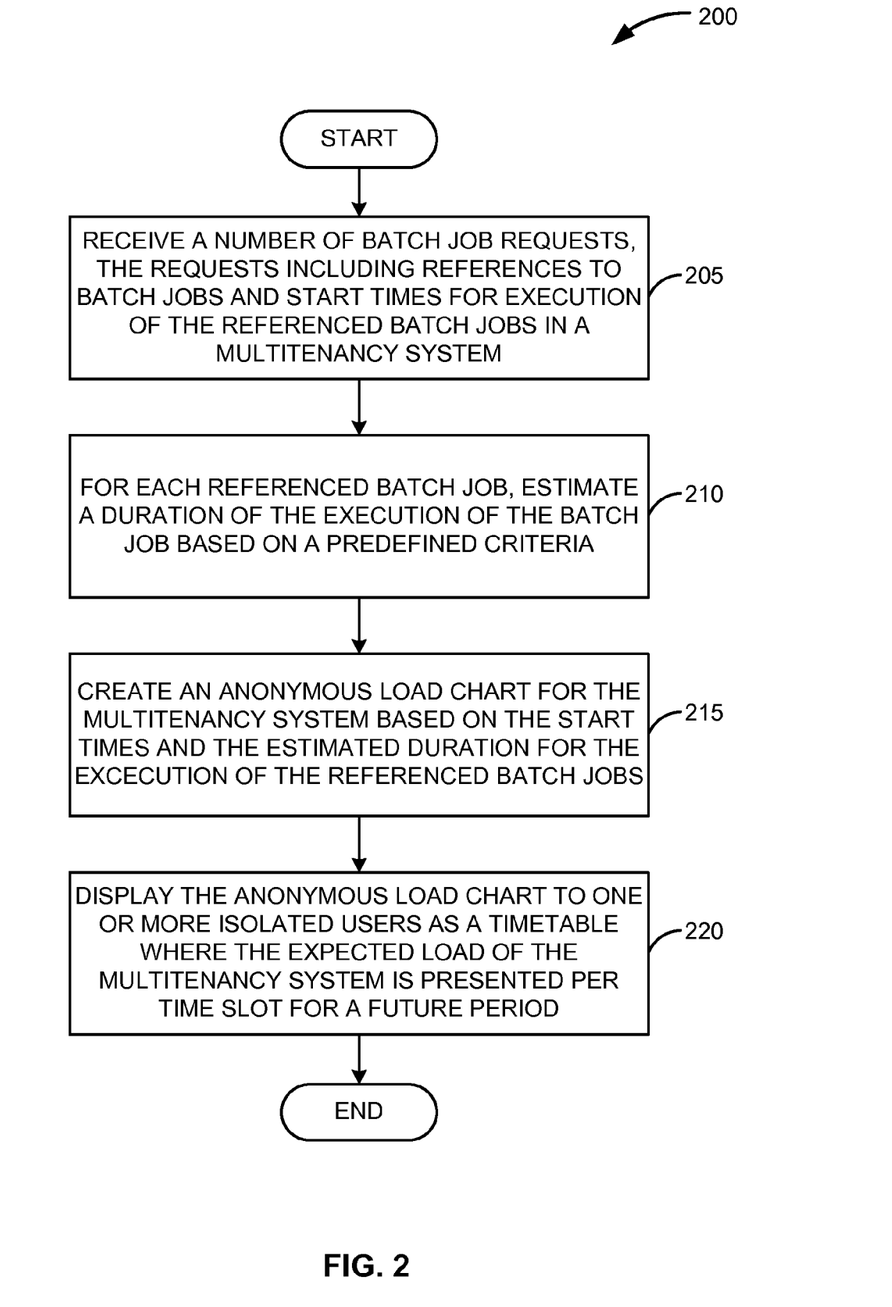
FIG. 2 is a flow diagram illustrating a process for estimating and showing the load of a multitenancy system resulting from a number of scheduled batch jobs, according to one embodiment of the invention.

FIG. 2 shows process 200 for forecasting the load of a multitenancy system caused from a number of scheduled batch jobs. According to one embodiment, the batch jobs are executed without interruptions. In another embodiment, the execution of the batch jobs may be suspended during their runtime to allow running of other jobs, or to avoid system overloads. However, executing the batch jobs without interruptions is more efficient because no time is lost for switching between tasks. For example, to interrupt batch jobs in business applications could be extremely expensive as these jobs require significant working set of data in the memory caches to execute efficiently. The interruptions invalidate the cache sets and increase the total runtime. The load of the system may be regulated to limit peak resource consumptions by smart scheduling based on the forecasting of the load of the system as illustrated in FIG. 2.

At 205, a number of batch job requests are received in a multitenancy system. Each of the received requests includes a reference to a corresponding batch job and a start time when the execution of the referenced batch job to be triggered. At 210, a duration of execution is estimated for each of the batch jobs referenced in the received requests. The estimated durations are used to generate or create an anonymous load chart for the multitenancy system at 215. The estimation of the execution durations and the creation of anonymous load chart may be performed by one or more centralized system processes of the multitenancy system with sufficient privileges to access information regarding the different tenants.

At 220, the anonymous load chart is displayed to one or more of the isolated tenants, e.g., one or more users of the isolated tenants. In the anonymous load chart no information specific for any of the tenants is provided. According to one embodiment, the load chart simply shows the forecasted system load per time slot for a predefined future period of time. The expected load of the multitenancy system may be presented relative to the available capacity of the system. The available capacity of the multitenancy system may vary due to different factors. For example, usually there is more capacity available at nights and during weekends when it is less likely for the users to request interactive services related to tasks that are performed during business hours. The capacity may also depend on factors like scheduled downtimes of application servers, planned database administration procedures, etc.

As shown in FIG. 2, at least two items are required to generate the load chart, the list of scheduled batch jobs, and the runtime per batch job. While the first item is simply the batch work list of the multitenancy system, the second item has to be calculated or estimated. Different criteria for estimating the runtime, e.g. the execution duration, of a batch job may apply to different types of batch jobs. For example, the criteria may depend on the kind of operations that are performed. Some of the operations may require intensive processor calculations, others may include more read/write memory operations, database access operations, etc.

Figure 3:
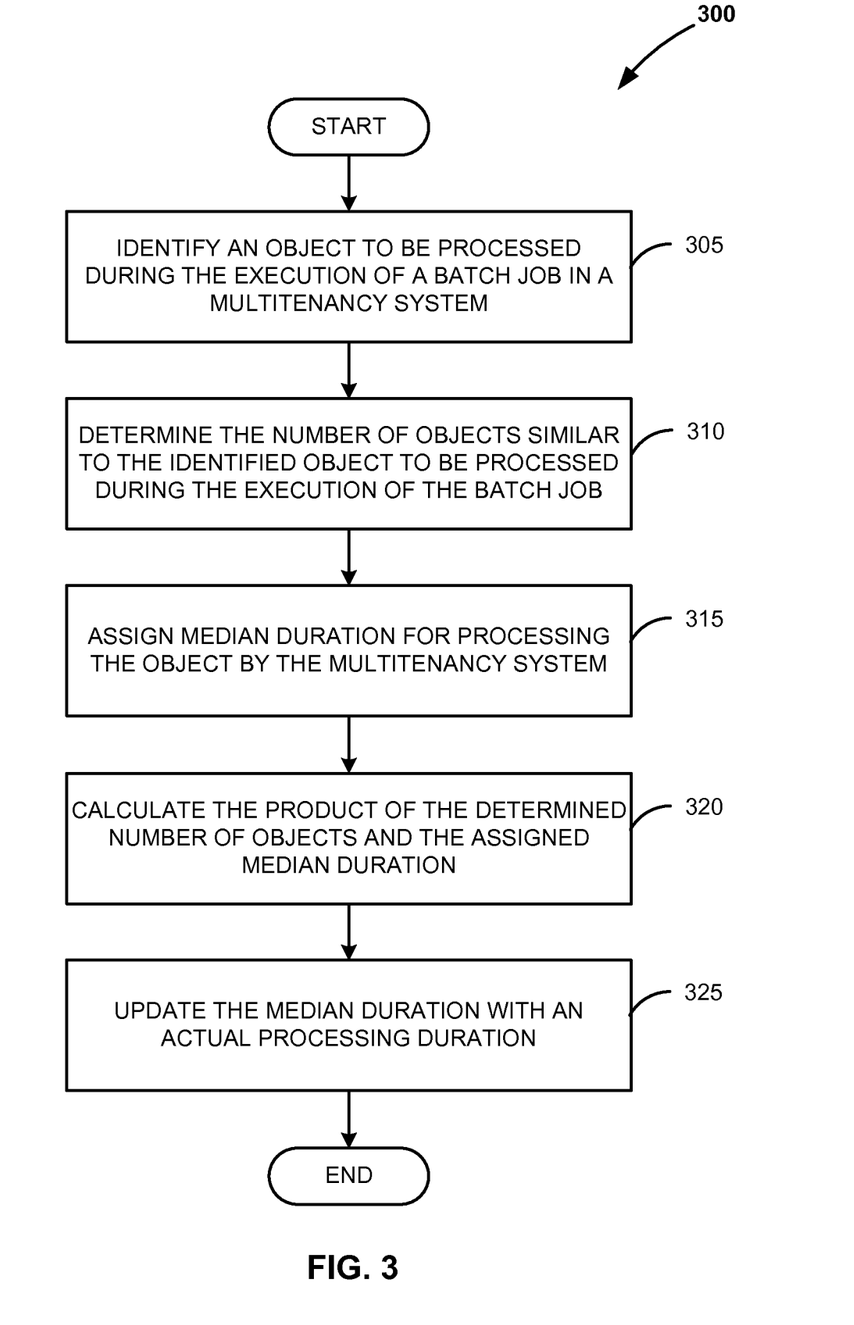
FIG. 3 is a flow diagram illustrating a process for estimating the duration of the execution of a batch job, according to one embodiment of the invention.

FIG. 3 shows a process 300 for estimating the duration of the execution of a batch job, according to one embodiment. The runtime of a batch job is typically linear to the number of objects that are processed. Therefore, according to one embodiment, the duration of the execution of a batch job may be determined simply as a product of the number of objects to be processed, and a median duration for processing a single object. According to one embodiment, the median duration is specific to the type of the batch job. At 305, an object to be processed during the execution of the batch job is identified. A total number of objects to be processed that are similar to the identified object can be quickly determined at 310. The number of objects to be processed may vary between the moment of receiving the corresponding batch job request and the start time of batch job execution. However, it could be assumed that the change of the number of objects would not be significant. The estimation of the runtime of the batch job is acceptable, whenever the number of the objects is determined between receiving the batch job request and the triggering of the batch job execution.

At 315, a median duration for processing the identified object is assigned. The median duration is an individual factor or coefficient showing an average time for processing an object of a particular type, e.g., an object similar to the object identified at 305. The duration of the execution of the batch job is estimated at 320 by calculating the product of the determined number of objects similar to the identified object, and the assigned median duration for processing the identified object.

Once the batch job is completed the actual processed number of objects may be used to update the initial assumption so that the estimation of the execution duration for the same batch job may become more precise over time. Similarly the median duration may be measured in a test system and serve as an initial value that is adjusted over time by comparing the estimated runtime with the actual runtime after each execution of the batch job. In one embodiment, the median duration may be updated with an actual duration for processing of an object similar to the identified object, as illustrated with 325.

A batch job may include processing objects of different types. In such a case, the actions illustrated with blocks 305 to 325 may repeat for every type of object included in a batch job. The duration for executing the batch job will be estimated as a total sum of each product of the number of objects and the assigned median duration per object type.

Typically, the job scheduling in a computer system is a centralized process performed by scheduler tools or directly by system administrators. The execution of jobs within particular time periods as requested by a number of users is scheduled and managed on a central level based on the available capacity of the computer system. The job scheduling may be a very resource consuming task for the administrators of multi-user computer environments. Even when specialized tools for job scheduling are utilized, peak resource consumptions are possible due to competing job requests. While it is difficult to maintain centralized job scheduling in complex multi-user systems, it is almost impossible to accomplish in multitenancy systems, as the complete isolation between tenants is one of the requirements any multitenancy system must comply with.

An overview of the expected resource consumption of a multi-user or multitenancy computer system may help the users of the system to request job executions for more appropriate times in order to avoid system overload. This is especially relevant for batch job requests with long runtimes. Generally, every user or tenant of a computer system is interested to behave cooperatively as system overload or peak resource consumption decreases the performance of the system for the user, as well as for the rest of the users. The system overload also increases the duration of the batch run and therefore creates a risk that it will not be completed by a given deadline. Additionally, the users and the tenants can be stimulated through further incentives to support cooperative behavior. For example, additional fees may be charged to a tenant for batch jobs scheduled at peak times. Different fees may be charged depending on the number of the batch jobs scheduled at peak times as well.

Figure 4:
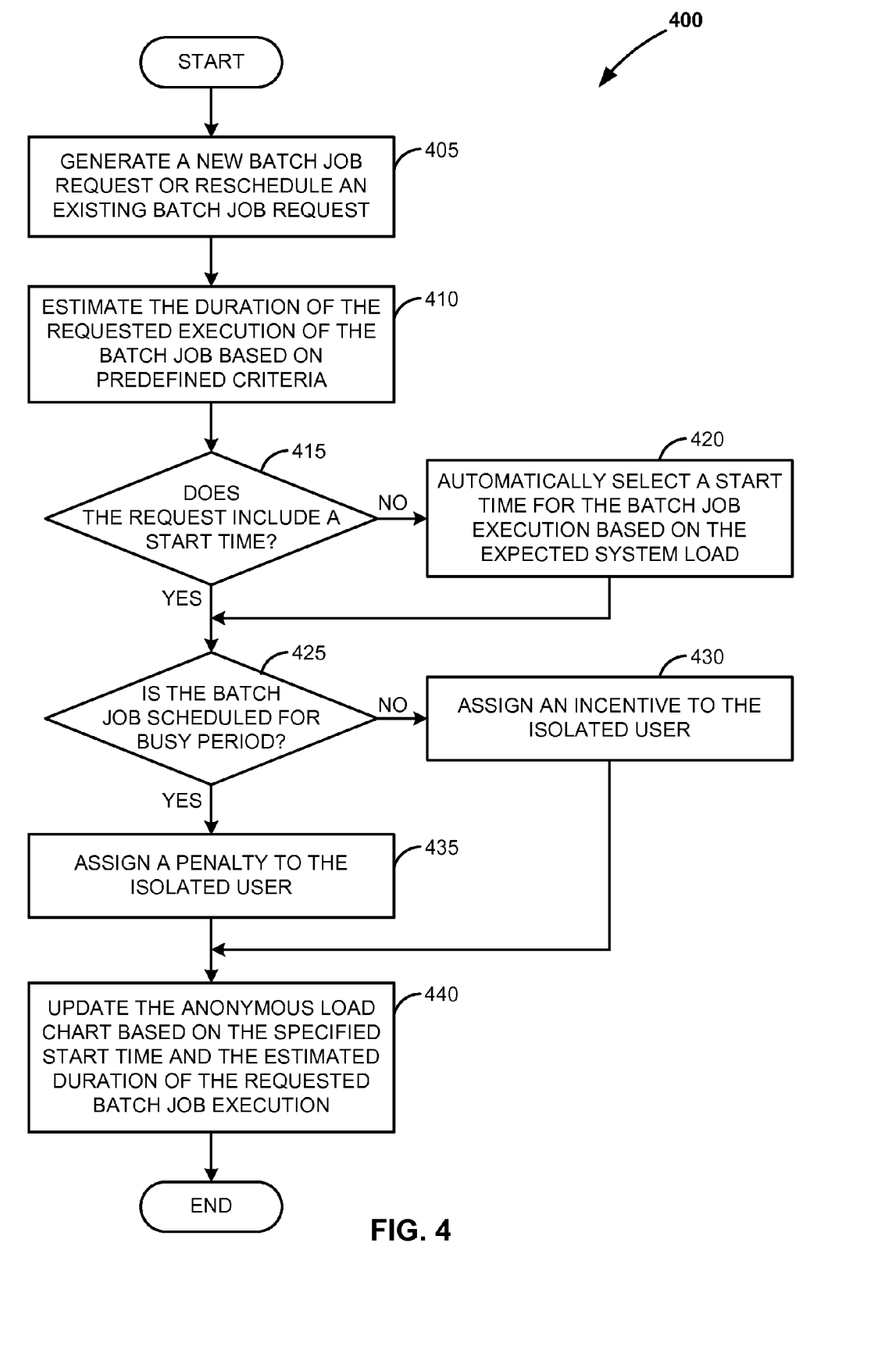
FIG. 4 is a flow diagram illustrating a process for cooperative scheduling of a batch job in a multitenancy system, according to one embodiment of the invention.

FIG. 4 illustrates a process for cooperative scheduling of batch jobs in a multitenancy system. At 405, a user of the multitenancy system may generate a new request for a batch job execution, or may reschedule the requested execution of a batch job. At 410, an expected duration for the requested execution of the referenced batch job is estimated based on predefined criteria. The estimation of the execution duration of the batch job may follow the process described with respect to FIG. 3. The estimation of the duration may account for the available capacity of the multitenancy system.

In one embodiment, a batch job execution request may specify either a start time, or an execution period for running the batch job. The users of the system have access to the anonymous load chart showing the expected system load. The user may specify the most appropriate start time or execution period for the batch job based on the expected system load, and the estimated duration of the batch job execution. At 415, it is verified whether the new or rescheduled batch job request includes a start time for triggering the execution. If start time is not specified, the system may automatically select a start time for the execution of the referenced batch job at 420 based on the expected system load.

When the start time is specified or selected, at 425, a check is performed to verify whether the requested batch job execution is scheduled for a busy period according to the anonymous load chart. If the execution of the batch job is not scheduled for a busy period, an incentive for the isolated user or the tenant may be assigned at 430. However, if the execution is scheduled for a busy period, a penalty may be assigned to the user at 435. The incentive versus penalty assignments play a role to stimulate the collaboration between isolated users of different tenants of a multitenancy system based on the anonymous load chart, according to one embodiment. At 440, the anonymous load chart is updated based on the specified start time and the estimated duration of the requested batch job execution.

Figure 5:
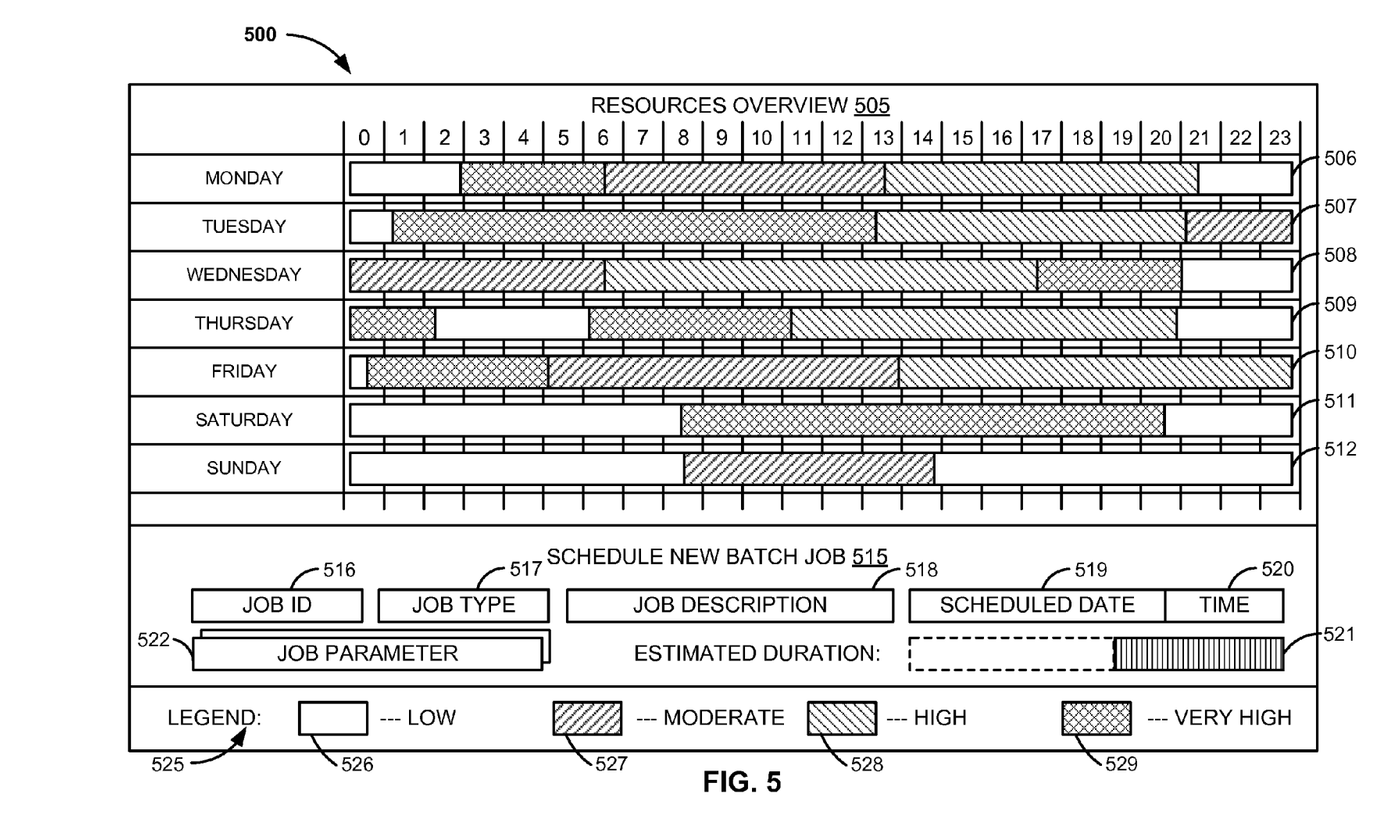
FIG. 5 illustrates a graphical user interface (GUI) for displaying a load distribution of a multitenancy system for a specified period, according to one embodiment of the invention.

FIG. 5 shows a graphical user interface (GUI) 500 for displaying a load distribution of a multitenancy system. The GUI 500 may be used to provide the users of the multitenancy system with access to the anonymous load chart and with means to assign start times to requests for batch job executions, according to one embodiment. The GUI 500 is divided in several areas as illustrated in FIG. 5. Area 505 is resource overview area including the main part of the anonymous load chart. The resource overview area 505 shows the expected load of the multitenancy system for a predefined future period per time slot. In the exemplary embodiment illustrated in FIG. 5, the predefined future period comprises one week, where each day of the week is illustrated with a labeled row of a table. The time slots are represented by columns of the same table, where each column corresponds to an astronomical hour.

The expected load of the multitenancy system is illustrated by load bars 506 to 512 with different colors or with different fill patterns per time slot. The load bars 506 to 512 are spread throughout the time slots for every day of the week as illustrated in FIG. 5. The colors or the fill patterns of the bars 506 to 512 help the users to intuitively follow the load distribution of the scheduled batch jobs in the multitenancy system. In one embodiment, the resource overview displayed in GUI 500 accounts for both the expected load from the scheduled batch jobs, and the available capacity of the multitenancy system per time slot. The available capacity may depend on the daily activities of the users of the multitenancy system, and usually varies over the course of the day.

Area 515 of the GUI 500 provides the users of the multitenancy system with means to schedule new batch jobs, according to one embodiment. A user may define batch job identification (ID) 516, e.g., a reference to a particular batch job. The batch job ID 516 may unambiguously define the requested batch job. A batch job may be also defined by its job type 517 in the batch job scheduler area 515. In one embodiment, a user may enter values for one or more different parameters in 522, when such parameters are required during the batch job execution. Batch job description 518 provides information for the referenced batch job. The scheduled date for executing the referenced batch job is defined in 519, and the start time may be entered in 520. The multitenancy system may automatically estimate the duration of the execution of the requested batch job based on the information provided in fields 516 to 520. The job type 517 may define an object type to be counted as well as a median duration for processing an object of this object type. The estimated duration is illustrated by the bar 521, where the length of the bar 521 corresponds to the execution duration.

The GUI 500 may also include a legend area 525, where the meaning of the different colors or the different fill patterns of the bars 506 to 512 is explained. For example, sample bars 526 to 529 in different colors or fill patterns may be used to define the corresponding load levels relative to the available system capacity.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
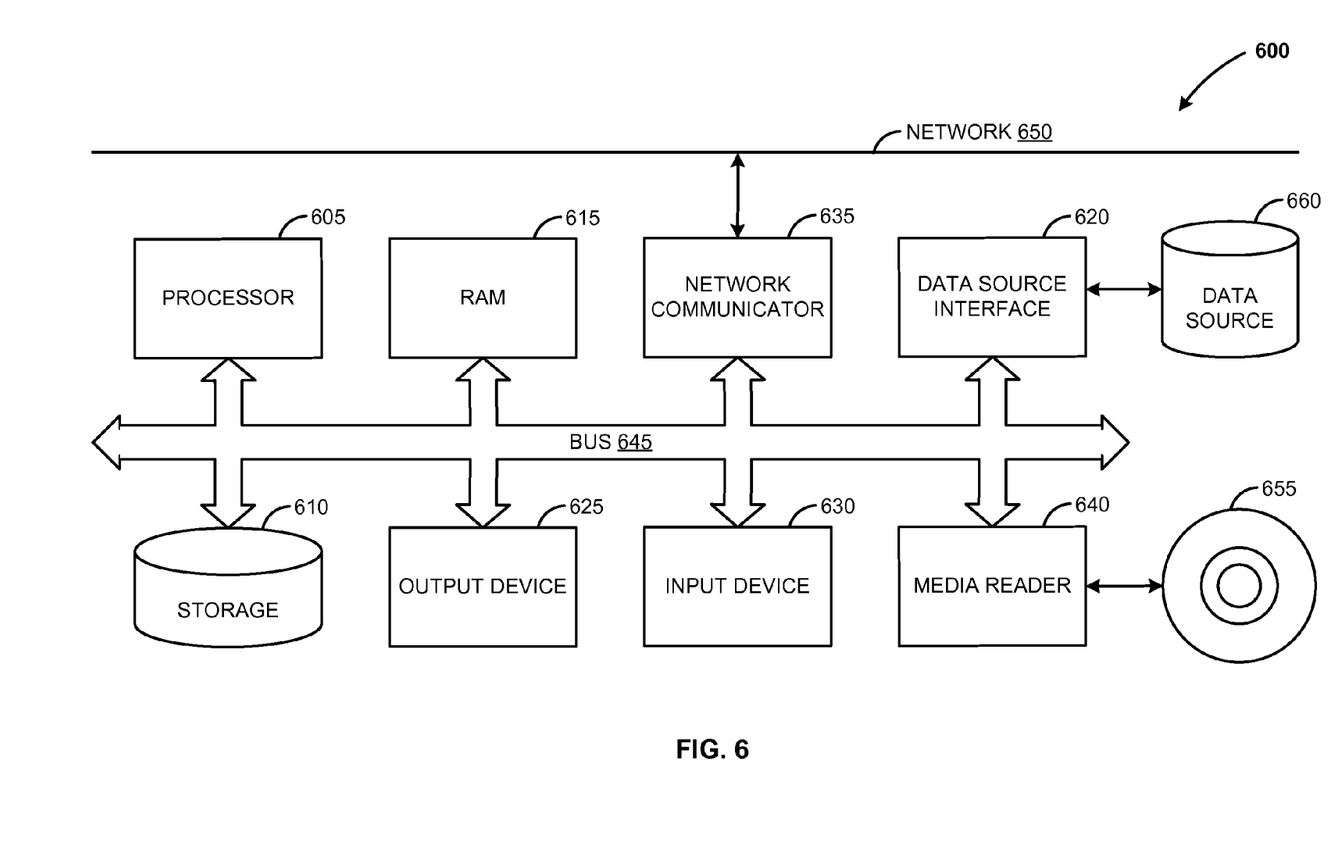
FIG. 6 is a block diagram of an exemplary computer system to cooperatively schedule batch jobs in a multitenancy system, according to one embodiment of the invention.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 may be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval.

Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer readable storage medium storing instructions, which when executed by a computer, cause the computer to:
   receive a plurality of job requests at a shared computer system from one or more of a plurality of isolated tenants of the shared computer system, wherein each job request of the plurality of job requests includes a reference to a corresponding job of a plurality of jobs and a start time for beginning an execution of the referenced job;
   for each job of the plurality of jobs referenced by the plurality of job requests, estimate, by the shared computer system, a duration of execution of the job based on a type of the job, wherein estimating the duration of execution of a job comprises:
      identifying a plurality of objects of a specific type to be processed during the execution of the job,
      assigning a median duration for processing an object of the specific type, wherein assigning the median duration comprises:
         estimating the median duration in accordance with an expected capacity of the shared computer system during the execution of the job, and
      adding, to the duration of execution of the job, a result of a multiplication between the median duration and a cardinality of the plurality of objects;
   create a distribution over a future period of time of load levels of the shared computer system resulting from the start times and the estimated durations of execution of the plurality of jobs referenced by the plurality of job requests; and
   expose a load chart of the distribution of the load levels of the shared computer system to at least one of the plurality of isolated tenants of the shared computer system to enable collaborative job scheduling between the isolated tenants for the future period of time.

2. The computer readable storage medium of claim 1 further comprising instructions, which when executed by the computer cause the computer to:
   receive an additional job request from one of the plurality of isolated tenants at the shared computer system after the creation of the distribution, wherein the additional job request includes a reference to an additional job and a start time for an execution of the additional job;
   estimate a duration of execution of the additional job referenced by the additional job request; and
   update the load levels of the shared computer system in the distribution in accordance with the start time for the execution of the additional job and the estimated duration of execution of the additional job.

3. The computer readable storage medium of claim 1 further comprising instructions, which when executed by the computer cause the computer to:
   after creating the distribution, receive an additional job request from one of the plurality of isolated tenants at the shared computer system, wherein the additional job request includes a reference to an additional job and a time period for an execution of the additional job;
   estimate a duration of execution of the additional job referenced by the additional job request;
   assign a start time for the execution of the additional job based on:
      the time period for the execution of the additional job,
      the estimated duration of execution of the additional job, and
      the distribution over the future period of time of the load levels of the shared computer system; and
   update the load levels of the shared computer system in the distribution in accordance with the start time for the execution of the additional job and the estimated duration of execution of the additional job.

4. The computer readable storage medium of claim 1 further comprising instructions, which when executed by the computer cause the computer to:
   update the median duration for processing an object of the specific type with the actual duration for processing the object of the plurality of objects of the specific type, after the job is completed.

5. The computer readable storage medium of claim 1, wherein creating the distribution comprises:
   estimating an expected load level of the shared computer system based on a system capacity for the future time period per a timeslot, wherein the duration of the future time period and the timeslot are one or more of predefined and dynamically selected.

6. The computer readable storage medium of claim 1, wherein exposing the load chart to the at least one of the plurality of isolated tenants comprises:
rendering a graphical user interface (GUI) including the distribution over the future period of time of the load levels on at least one display device corresponding to the at least one of the plurality of isolated tenants.

7. The computer readable storage medium of claim 1 further comprising instructions, which when executed by the computer cause the computer to:
associate one or more of a plurality of colors and a plurality of fill patterns with a plurality of load levels to illustrate the distribution of the load levels in the load chart.

8. A computerized method for enabling collaborative batch scheduling in a multitenancy computer application environment for a plurality of isolated tenants, the method comprising:
receiving, from one or more of the plurality of isolated tenants of the multitenancy application environment, a plurality of requests for execution of a plurality of corresponding batches in the multitenancy application environment, wherein each request of the plurality of requests includes a job type of a corresponding batch and a start time for beginning an execution of the corresponding batch;
for each of the plurality of requests, estimating a duration of execution of the corresponding batch based on the job type, wherein estimating the duration of execution of a batch comprises:
identifying a plurality of similar objects to be processed during the execution of the batch,
assigning a median duration for processing an object of the plurality of similar objects, wherein assigning the median duration comprises,
estimating the median duration in accordance with an expected capacity of the multitenancy application environment during the execution of the batch, and
including a result of a multiplication between the median duration and the number of the similar objects in the duration of the execution of the batch;
creating a distribution over a future period of time of load levels of the multitenancy application environment resulting from the start times and the estimated duration of execution of each batch of the plurality of batches; and
exposing a load chart of the distribution of the load levels of the multitenancy application environment to at least one of the plurality of isolated tenants of the multitenancy application environment for collaborative batch scheduling between the isolated tenants for the future period of time.

9. The method of claim 8 further comprising:
after creating the distribution, receiving, from one of the plurality of isolated tenants, an additional request for execution of an additional batch in the multitenancy application environment, wherein the additional request includes a job type and a start time for an execution of the additional batch;
estimating a duration of execution of the additional batch; and
updating the load levels of the multitenancy application environment in the distribution in accordance with the start time for the execution of the additional batch and the estimated duration of execution of the additional batch.

10. The method of claim 8 further comprising:
after creating the distribution, receiving, from one of the plurality of isolated tenants, an additional request for execution of an additional batch in the multitenancy application environment, wherein the additional request includes a job type and a time period for an execution of the additional batch;
estimating a duration of execution of the additional batch;
assigning a start time for the execution of the additional batch based on the time period for the execution of the additional batch, the estimated duration of execution of the additional batch and the distribution over the future period of time of the load levels of the multitenancy application environment; and
updating the load levels of the multitenancy application environment in the distribution in accordance with the start time for the execution of the additional batch and the estimated duration of execution of the additional batch.

11. The method of claim 8 further comprising:
updating the median duration for processing an object of the plurality of similar objects with the actual duration the plurality of similar objects were processed.

12. The method of claim 8, wherein creating the distribution comprises:
estimating an expected load level of the multitenancy application environment based on a system capacity for the future period per a timeslot, wherein the future period and the timeslot are one or more of predefined and dynamically selected.

13. A computer system for enabling collaborative batch scheduling in a shared resources environment for a plurality of isolated clients, the system comprising:
a computer memory to store program code; and
a processor to execute the program code to:
estimate a duration of an execution of each of a first plurality of batch jobs based on a corresponding job type and a corresponding execution start time, wherein estimating the duration of the execution of each of the first plurality of batch jobs comprises:
dividing a batch job of the first plurality of batch jobs to a plurality of recurring operations,
assigning a median duration for processing a single instance of an operation of the plurality of recurring operations, wherein assigning the median duration comprises:
estimating the median duration in accordance with a forecasted capacity of the shared resources during the execution of the batch job, and
adding, to the duration of the execution of each of the first plurality of batch jobs, a result of multiplication between the median duration and a number of recurrences of the operation in the batch job; and
generate a report for a resource consumption of the shared resources environment for a predefined future period, the resource consumption resulting from the estimated duration of the execution of the first plurality of batch jobs and the corresponding start times, wherein the report is accessible by at least one of the plurality of isolated clients of the shared resources environment.

14. The computer system of claim 13 further comprising:
estimate a duration of an execution of at least one of a second plurality of batch jobs based on a job type; and
update the report for the resource consumption of the shared resources environment for the predefined future period based on the estimated duration of the execution of the at least one of the second plurality of batch jobs and at least one corresponding start time.

15. The system of claim 13 further comprising:
updating the median duration for processing a single instance of the recurring operations with an actual duration for processing of at least one instance of the plurality of recurring operations.

\* \* \* \* \*